Aug. 6, 1940.   A. F. HICKMAN   2,210,241
SPRING SUSPENSION FOR VEHICLES
Original Filed Feb. 27, 1934   3 Sheets-Sheet 1

INVENTOR
Albert F. Hickman
BY
Poepp and Poepp
ATTORNEYS

Aug. 6, 1940.   A. F. HICKMAN   2,210,241
SPRING SUSPENSION FOR VEHICLES
Original Filed Feb. 27, 1934    3 Sheets-Sheet 2

INVENTOR
Albert F. Hickman
BY
Pogge and Pogge
ATTORNEYS

Aug. 6, 1940.  A. F. HICKMAN  2,210,241
SPRING SUSPENSION FOR VEHICLES
Original Filed Feb. 27, 1934   3 Sheets-Sheet 3

INVENTOR
Albert F. Hickman
BY
Pojays and Pojays
ATTORNEYS

Patented Aug. 6, 1940

2,210,241

UNITED STATES PATENT OFFICE 2,210,241

SPRING SUSPENSION FOR VEHICLES

Albert F. Hickman, Eden, N. Y., assignor to Hickman Pneumatic Seat Co. Inc., Eden, N. Y., a corporation of New York Original application February 27, 1934, Serial No. 713,161. Divided and this application January 9, 1940, Serial No. 313,122

24 Claims. (Cl. 267—57)

This invention relates to a spring suspension for vehicles, and more particularly to a spring suspension for those vehicles or portions of vehicles subjected to a relatively small variation in load such as in the case of passenger automobiles and aeroplanes, railway cars, and the front ends of trucks and buses.

This application is a division of my copending application Serial No. 713,161 filed February 27, 1934 for Vehicle spring suspension.

The principal objects of the invention are: (1) To resiliently oppose both up and down vehicle wheel movement by a purely geometric resilient resistance instead of by an arithmetic or a partially arithmetic and partially geometric resilient resistance, (2) to reduce vehicle side sway any desired amount down to and including zero side sway, and even beyond to any desired amount of negative side sway, (3) to eliminate wheel tramp, (4) to considerably reduce the torsional forces to which the vehicle body is subjected, particularly as to the end of the body which is adjacent the axle being deflected, (5) to rapidly dampen out periodic vibration of the spring suspension even if the shock absorbers should become more or less inoperative or even fractured, (6) to reduce the number of shock absorbers required on the vehicle and to reduce the work imposed upon them, (7) to eliminate all frictional resistance except that incident to pivot bearings and shock absorbers, (8) to entirely eliminate the squeaks and lubrication inconvenience of the conventional leaf spring, (9) to definitely limit the stress to which the resilient elements may be subjected, (10) to prevent the wheels from dragging the body down when said wheels move down beyond their normal range of movement, (11) to prevent any change of steering spindle caster even though the resilient members of the spring suspension are stretched past their elastic limit or become fractured, and, at the same time, to eliminate the need of torque rods, (12) to enable a spring suspension of this type being adjusted for maximum efficiency under different loads, (13) to considerably reduce side sway of the vehicle even if the axle pivot of the spring suspension is below the component of the sprung weight center of gravity of the companion axle, (14) to prevent the vehicle body from being subjected to lateral shocks as a consequence of lateral axle movement and to thereby also prevent "tire scuff", (15) to prevent any of the parts of a spring suspension of this type from becoming locked in a past-dead-center position, (16) to enable the vehicle to be safely driven even if the resilient members of the spring suspension become fractured, and (17) to provide means for enabling a considerable torsional deflection of a torsion member even though the overall length of the torsion member is relatively short. Numerous other objects of the invention and practical solutions thereof are described in detail in the herein patent specification wherein:

In the accompanying drawings:

Fig. 1 is a diminutive, top plan of a passenger automobile chassis, provided with one form of my improved spring suspension.

Fig. 2 is a diminutive, vertical, longitudinal section thereof, taken on line 2—2, Fig. 1.

It is to be understood that similar characters of reference indicate like parts in the several figures of the drawings.

My invention may be embodied in various forms and in spring suspensions of different constructions, and the present embodiments thereof are to be regarded merely as a few of the set-ups which carry out the invention in practice.

In the form of the invention shown in Figs. 1–9, and in all the other forms of the invention, the main frame of the vehicle chassis is constituted in the usual and well known manner of a pair of longitudinal and substantially horizontal, side frame bars 30 and 301 which are connected at their front and rear ends respectively by the front and rear cross bars 31 and 311.

The entire vehicle chassis, together with its spring suspension, is constructed substantially symmetrically about a vertical longitudinal medial plane, and hence it is deemed sufficient to confine the following description almost entirely to the one (left) side of the vehicle, it being understood that a similar and substantially symmetrical arrangement is to be found on the other (right) side of the vehicle. Furthermore, the spring suspension at the rear end of the construction of Figs. 1–9 is somewhat simpler in construction than the front end, and will for that reason be described first.

Secured adjacent the rear end of the left side frame bar 30 is a pair of hangers 32 and 320. In the lower end of the forward hanger 32 (see Figs. 9, 7 and 6) is journalled a pivot pin 331 having a head and a nut similar in appearance to a bolt. Said pivot pin 331 is shown as connected through a universal joint 34 with a torsion rod 33, the extreme forward end of the latter being shown as bent sharply upward to form the torque arm 35, as shown in Figs. 4, 3, 2 and 1. The upper end of said torque arm is shown as provided with an adjusting screw 36, (or other suitable adjusting means) the inner end of which bears against a pad 37 which may, if desired, be constructed of resilient material such as rubber, and is suitably secured to the adjacent vertical longitudinal face of the companion frame bar 30. The purpose of this adjustment screw 36 is to adjust the amount of torsional stress imposed upon its companion torsion rod 33.

It is to be understood that when such an adjustment is not desired, (if it be desired to render the device more fool-proof, for instance) the spring suspension may be produced with sufficiently restricted torsional and other tolerances, and said adjusting screw 36 then entirely eliminated. Likewise, the pad 37 may, if desired, be also eliminated, a resilient connection at this point being, as a matter of fact, of very small intrinsic worth due to the fact that only under very unusual circumstances will conditions be such as to allow the torque arm 35 to move away from the frame bar 30. It is likewise obvious that the universal joint 34 may also be eliminated if the vehicle set-up is such as to permit the two sections of the torsion rod 33 to be disposed in axial alignment with each other.

If desired, the intermediate portions of the torsion rod 33 may, as shown, be suitably supported on the frame bar 30 by a pair of bearings 38 and 381, the latter being secured to said frame bars 30, 301 in any suitable manner.

The rear portion or head of the universal joint 34 is suitably flanged and detachably connected by cap screws 40 with the inner end of a bifurcated, front crank arm 41. This construction, in effect, rigidly connects the pivot pin 331 with said front crank arm 41. It is obvious that such a rigid connection may be effected in numerous ways other than in the particular manner illustrated. When the vehicle is normally loaded and at rest, this front arm 41 projects outwardly and substantially horizontally from the torsion rod 33, as shown in Figs. 7, 6, 9, 1 and 2. In this position the outer end of said front crank arm 41 is resiliently urged downwardly by the resilient stress imposed upon it by the torsional stress of its companion torsion rod 33.

Figure 9:
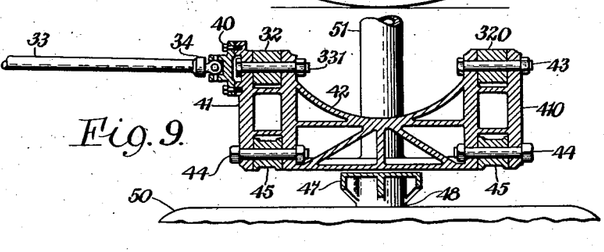
Fig. 9 is a fragmentary, horizontal section thereof, taken on line 9—9, Fig. 6.

As best shown in Fig. 9, the outer part of said bifurcated front crank arm 41 is connected on its outer rear side by an integral webbing 42 (or otherwise) with the outer part of a companion, bifurcated, rear crank arm 410. The inner end of this rear crank arm 410 is provided with a pivot pin 43 which is pivoted in the rear hanger 320 aforedescribed. The axis of this pivot pin 43 is coincident with the axis of the pivot pin 331 thereby permitting the two crank arms 41 and 410 (together with the integral webbing 42 which joins them) to swing in a vertical transverse plane about the common axis of said pivot pin 331 and of said pivot pin 43.

The outer ends of both of said crank arms 41 and 410 are bifurcated and are provided with a pair of horizontal pivot pins 44 which are axially in line with each other. The central portion of each pivot pin 44 is pivoted in the normally lower end of a companion link 45, which latter, in the normal or static, loaded position of the vehicle spring suspension shown in Figs. 7, 6, 9, extends upwardly and inwardly from said pivot pin 44.

The upper ends of the two links 45 are split (see Fig. 7) and are clamped upon the opposite ends of a relatively long, horizontal, longitudinal, axle-pivot shaft 46. By reason of the fact that said links 45 are both clamped at their upper ends to said axle-pivot shaft 46, the term links is not strictly accurate, but has been here used to avoid excessively clumsy phraseology and to more clearly distinguish said "links" from the crank arms 41, 410.

Between said links 45 is disposed an upstanding Y shaped trunnion 47, the upper, bifurcated arms of which are journaled on said axle-pivot shaft 46 while its lower control part or head is suitably secured by welding or otherwise to a companion wheel spindle 48. The latter has a rear, driving wheel 50 journaled thereon in the usual and well known manner. This spindle 48 constitutes one of the outer ends of the rear or drive axle (or axle housing) 51.

Figures 7, 8:
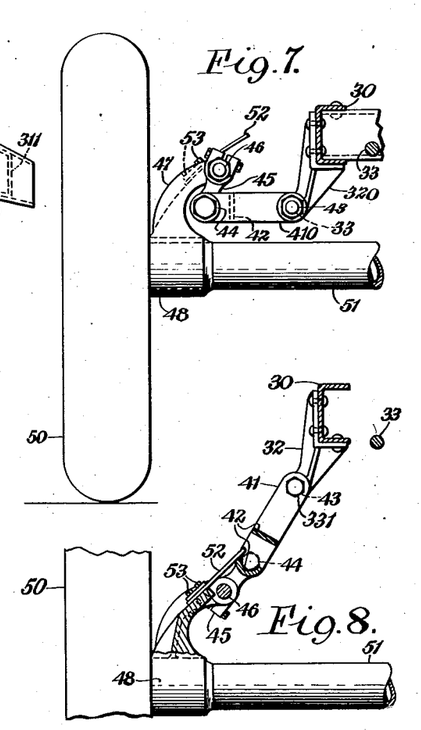
Fig. 7 is a fragmentary, vertical, transverse section thereof, taken on line 7—7, Fig. 6.
Fig. 8 is a fragmentary, vertical, transverse section thereof, similar to Fig. 7 but taken on a line indicated by 8——8 in Fig. 6 and showing the parts in a different position from that of the other figures.

When said drive axle 51 drops approximately to its lowermost position relatively to the vehicle frame, as shown in Fig. 8, there is a possibility (unless such a contingency be positively prevented) that the crank arms 41, 410 and links 45 will be moved by inertia forces past their dead-center position, and become locked in this position. To prevent any such occurrence a flat, limiting spring 52 is secured to the central part of the trunnion 47 by means of cap screws 53 or otherwise, the outer portion of said limiting spring 52 being adapted to make contact (see Fig. 8) with the central, outer portion of the webbing 42 which forms an integral part of the two crank arms 41 and 410. This contact between said spring 52 and webbing 42 is initially made at a relatively long distance from the absolute dead-center position and the parts then gently stopped at the final position of complete rest shown in Fig. 8 where the parts are shown as having almost, but not quite, arrived at an absolute dead-center position. It should be noted that in this connection, however, that, even if the parts move to or even beyond an absolute dead center position, said parts are not likely to lock in this past-dead-center position because the resilient force of the torsion rod 33 is always urging the pivot pins 44 downwardly, and this factor may, in actual practice, be quite safely relied upon to "break" any possible dead center locking.

When the axle 51 is forced upwardly relatively to the main frame from the position of Fig. 7 (or, vice versa, when the body under the influence of momentum, is forced downwardly relatively to said axle) the effective resilient opposing force of the torsion rod 33 increases at a geometric and not at an arithmetic rate. In the particular case, the geometric rate is of the accelerated increase type, in which increments of vertical movements of the axle are opposed by an accelerated rate of resilient resistance. This is primarily due to the progressive decrease in the effective lever arm of the crank arms 41, 410, as they swing upwardly and inwardly about the rear section of the torsion rod 33 and the pivot pin 43 as an axis of rotation. This action is also influenced by the varying angularity of the links 45 and the fact that increments of vertical displacement of the pivot pins 44 cause accelerated rates of increase in the angular displacement of the torsion rod 33. This latter is due to the fact that increments of vertical movement of said pivot pins 44 are not proportional to the accompanying increments of angular twist to which their companion torsion rod 33 is subjected.

This geometric action also occurs when the axle 51 moves downwardly a certain distance relatively to the frame bar 30 from the normal position of Fig. 7 to a position intermediate of the extreme position of Fig. 8. Throughout this particular movement, the geometric action is of the accelerated decrease type, i. e., as the axle passes through increments of downward movement, the rate of decrease of the resilient force tending to push said axle downward increases.

Thus, as the axle moves downwardly from the position of Fig. 7, the resilient force tending to push it downwardly decreases at an accelerated rate. Finally, at a position intermediate of Figs. 7 and 8, this downward pressure on the axle 51 becomes equal to zero. Then, as said axle continues to move downwardly beyond this intermediate point, the torque arm 35 is turned or rotated outwardly away from its pad 37, thereby relieving the torsion rod 33 of all torsional stress, thereby maintaining at zero the value of the resilient force interposed between the axle and the main frame. This condition continues until the axle has moved downwardly to its lowermost position as shown in Fig. 8. During this last mentioned downward axle movement, said axle, together with its wheels 50 and other unsprung weight, rests with its entire weight upon the ground (assuming, of course, the latter to be within reach) and hence without any of said unsprung weight urging the main vehicle frame downward. This means that, as far as vertical forces are concerned, said vehicle frame is, at this time, free to "float" along solely under the influence of gravity (plus whatever vertical momentum forces are present), this feature of the invention being of particular significance when it is realized that the load carried by the vehicle is also, at this time, solely under the influence of gravity (plus whatever vertical momentum forces are present). The consequence is that, within this particular range of movement, the load in the vehicle moves vertically up and down with the same acceleration and deceleration as the body and hence without changing the pressure between the load and body. Such a desirable result is quite different from that obtained from the conventional spring suspension in which the axle and the rest of the unsprung weight drags or jerks down the main frame whenever the strain imposed on the main springs is negative. In the present invention no such negative force, tending to pull the body downward, is possible.

The front or steering axle 511 of the vehicle of Figs. 1-9 is provided with a spring suspension analogous to that just described for the back axle 51. However, certain inherent characteristics of a front axle require certain modifications to the resent invention when the same is to be applied to a front axle. In the case of the form of front axle 511 shown in Figs. 3, 4, 5, 1 and 2, for instance, a wheel spindle 481 having a wheel 501 journalled thereon is pivoted on a substantially vertical spindle pin 55 at each end of said front axle 511. The two wheel spindles 481 at opposite ends of said axle are assumed to be cross connected for steering purposes in the usual and well known manner. Extending horizontally inward from one of these spindles is a steering arm 56 connected by a universal joint 57 with the front end of the usual steering or drag link 58 (see Fig. 5). The rear end of the latter is connected, in the usual and well known manner, by a universal joint 60 with the lower end of a manually actuated steering lever 61.

It is important that the steering arm 56 be never moved relatively to the axle 511 as a consequence of any sort of up and down axle movement. Any such deleterious movement has been absolutely prevented by the construction here illustrated. A radius rod 62 is connected at its front end by a universal joint 63 with the front axle 511 and is connected at its rear end by a universal joint 64 with the side frame bar 30 of the main frame. This radius rod 62 has its universal joint pivots 63 and 64 spaced apart the same distance as the spacing apart of the universal joint pivots 57 and 60 of the drag link 58. In addition to this, the disposition of the various pivot centers is such that all planes intersecting the pivots 63 and 64 of the radius rod 62 are parallel to all planes intersecting the pivots 57 and 60 of the drag link 58.

A small amount of longitudinal clearance is then provided at 65 whereby the axle 511 with its trunnion 471 is free to slide a short distance in excess of one quarter of an inch, longitudinally on the axle pivot shaft 461, the latter being firmly clamped at its opposite ends in the upper split ends of the links 451. Because of this arrangement, as the axle 511 rises or falls, it is caused to move longitudinally about the pivot 64 as a center and to thereby prevent any turning of the spindle 481 about its vertical pivot 55 as the pivot 57 of said spindle swings about the drag link pivot 60 as a center. In actual practice the amount of this longitudinal movement of the front axle is so small, that both the radius rod 62 and clearance 65 may be entirely eliminated without any serious detrimental effect on the steering of the vehicle.

There is one very important factor involved, in any front axle set up, namely the permanence of the caster or the angle in a vertical longitudinal plane of the spindle pivots 55. It is to be noted that, in the present invention, the caster of the steering wheels remains absolutely fixed, irrespective of whether or not a radius rod 62 is used and irrespective of whether the torsion rod 33 becomes either deformed or even completely broken.

This feature of fixed caster angle is also of some importance with respect to the back axle, where it ensures the permanency of the arcs through which the universal joints of the propeller shaft are caused to swing as the axle rises and falls. In the case of both front and rear axles, the construction whereby the caster angle is permanently maintained, irrespective of what may happen to the resilient portions of the spring suspension, also ensures that all torque imposed upon the axles by the brakes is suitably taken care of without the need of any special torque rods for this purpose.

In the case of both the front and the rear axle spring suspensions, the links 45, 451 incline downwardly and outwardly. This arrangement has two distinct advantages. One effect of this angular linkage arrangement is that it causes each end of the body of the vehicle to always tend to centralize itself relatively to the companion axle 51 or 511 as the case may be. This centralizing tendency is caused by the effect of gravity, which may be considered a resilient, downwardly-acting force acting between the body and the roadbed and operating in a manner identical in its effects to a metal spring connecting said body and the roadbed. It is to be distinctly understood that this force tending to centralize each end of the body is of a resilient nature. Because of this fact the body of the vehicle is not subjected to directly connected lateral forces as a consequence of a lateral axle movement. Such a lateral axle movement occurs, for instance, when one end only of the axle is raised or depressed and thereby causes horizontal, lateral-movement components in all parts of the axle except at its momentary axis of rotation in those particular cases where said axis lies within the overall length of said axle. In the conventional spring suspension, all movements of the axle which are lateral with respect to the vehicle as a whole are transmitted directly to the body. Because of the relatively large inertia of the latter, no appreciable lateral body movement actually occurs when such a conventional vehicle is travelling at high speeds and one end of the axle moves up or down. What does occur is that said body is subjected to a sharp lateral rap of considerable force everytime the axle moves in any manner other than translationally. This not only seriously impairs the riding qualities of the vehicle but also subjects the body to a succession of forces which in a short period of time loosen all the body bolts and other such fastenings and cause the whole body to rattle.

Another important advantage obtained by the angular arrangement of the links 45, 451 is that it absolutely eliminates wheel tramp. This latter may be broadly defined as a periodic vibration of either axle in a vertical transverse plane, the definition being usually limited to a rotary movement about an axis of rotation located at some point in the axle. In general it may be said that, if one wheel is lifted, and if this movement causes a downward thrust on the opposite wheel, then wheel tramp results. Such wheel tramp is prevented in the present invention by ensuring that the downward thrust of the axle pivot 46 or 461, as the case may be, lies approximately in a plane intersecting the contact of the tire with the road. When such a condition obtains, a vertical upward thrust against one wheel is opposed by a directly opposite force passing through the axle pivot 46 or 461 and hence no downward thrust is imposed upon the opposite wheel as occurs in the conventional spring suspension.

Another very important advantage of the present invention is that all forces tending to twist the frame have been very markedly reduced as compared with conventional spring suspensions. Frame twist may be defined as a torque force applied to one end of the frame, different in direction and intensity from the torque force imposed upon the other end of the frame. In the present invention, when, for instance, one of the vehicle wheels is thrust upwardly, the frame hangers 32, 320 (321, 3210) are subjected to a force intersecting the axis of the pivot pin 43 (and adjacent short end of the companion torsion rod 33). Such a force constitutes a torque force imposed upon the adjacent end of the vehicle frame, and this, all by itself, would, of course, cause frame twist. It is to be noted, however, that, at this time, the companion torsion rod 33 is under increased stress by reason of the wheel thrust in question and hence the torque arm 35 is subjected to an increased force which also constitutes a torque force upon the vehicle frame. It is to be noted that this increased force which is imposed upon said torque arm 35 is located at one end of the vehicle while the torque force at the pivot pin 43 is at the other end of the vehicle. Furthermore, the forces are not greatly different in intensity or direction. The result of this condition of affairs is that both ends of the vehicle are subjected to torque forces which do not differ from each other to any marked degree in either direction or intensity, and hence frame twist is very considerably reduced. In other words, when a certain wheel of the vehicle is forced upward, instead of twisting the one end of the vehicle frame as in the conventional spring suspension the present invention provides that the entire one side of the vehicle will be lifted a minute distance, thereby increasing the inertia resistance of the sprung weight to the resilient forces caused by the wheel movement, and very markedly decreasing frame twist and its concomitant twisting and rocking of the body and resulting loosening of the various body fittings.

As to this matter of frame twist, it is to be noted that satisfactory results can only be obtained if the "dead" end of the torsion rod extends toward the opposite end of the vehicle and is positioned beyond the center of gravity of the car. If this condition does not obtain, then both ends of the torsion rod cause torque forces which act in the same general direction and upon the same end of the vehicle and hence cause frame twist. If, as in the present invention, the "dead" end of the torsion rod is situated beyond the center of gravity of the sprung weight (body) then the forces are acting upon opposite ends of the vehicle and frame twist is reduced.

It is also to be noted in the present invention that the means whereby resilience is effected does not involve any frictional resistance such as occurs in the case of a conventional leaf spring, and hence is free and non-energy absorbing in its action. Also, having no frictional resistance (except bearings which afford no particularly difficult lubrication problems) it does not vary because of change of frictional resistance as in the case of the conventional leaf spring.

No shock absorbers are illustrated as used in conjunction with the spring suspension. However, it is desirable to employ shock absorbers in connection with this suspension. Nevertheless the riding qualities of a vehicle equipped with the present invention are not seriously reduced even if the shock absorbers become inoperative or are left off altogether. This is in sharp contrast to the ordinary individually sprung wheel suspension using helical springs, in which case the vehicle receives a terrific wracking and pounding if the shock absorbers become even partially inoperative. In the present invention, it has been found by definite test, that the periodic vibrations of the spring suspension are very rapidly damped out, even in the total absence of shock absorbers. As an example of how marked the dampening action is, a series of tests were run on three types of spring suspension in which the load and displacement were the same and also the maximum metal stress in the respective resilient members. It was found that a helical spring, under these circumstances, would come to rest after 800 vibrations, the leaf spring after 20 vibrations, and the present invention after 5 vibrations. Why the leaf spring should be so superior to the helical spring is easy to understand because of the relatively high friction in a leaf spring even when well lubricated. The significant fact is that in applicant's spring suspension, there is no such leaf spring friction and yet its performance is four times as good as the leaf spring set up, despite the fact that the frictional resistance of the present invention is not materially different from that of the helical spring, individually sprung wheel set up.

In the present invention, side sway of the vehicle frame can be reduced to any desired extent including zero side sway and even negative side sway. To deal rationally with this question it is highly desirable that we first mathematically split the center of gravity of the car into two components, each component lying in the intersection of a verticle, longitudinal, medial plane with vertical, transverse planes passing through the axes of the companion pair of wheels. Each component of the center of gravity is then the mass which, when the vehicle is steered to the right or left, creates a lateral force which tends to tip its companion end of the vehicle in a lateral direction relatively to the companion. The reason why it is desirable to deal with a center-of-gravity component over each axle individually is because the component over the front axle is usually at a different height above the ground from the center-of-gravity component over the rear axle and hence requires a different arrangement to obtain the same kind and degree of said sway. This side sway should be the same at both ends of the vehicle because otherwise the frame is subjected to twisting forces whenever any side sway occurs.

Figure 3:
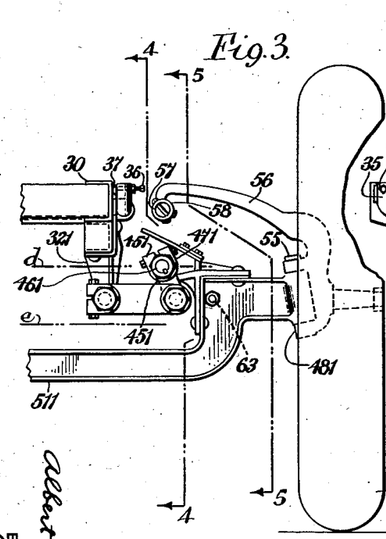
Fig. 3 is a fragmentary front-end elevation thereof showing the front axle and associated parts.
Figure 4:
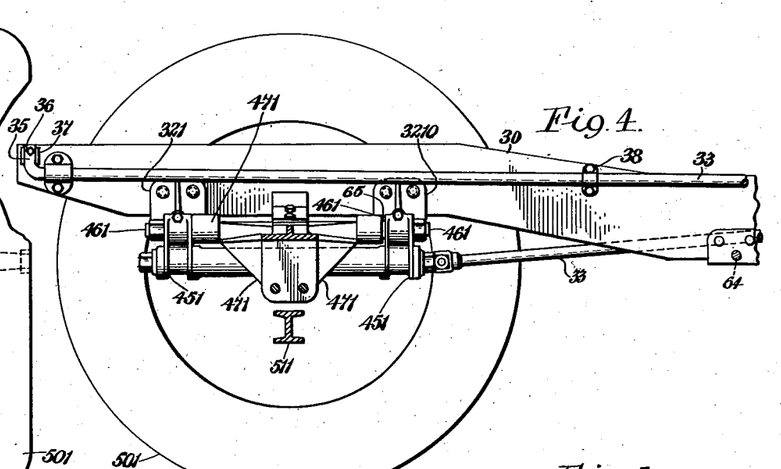
Figs. 4 and 5 are fragmentary, longitudinal sections thereof, taken on correspondingly numbered lines of Fig. 3.
Figure 5:
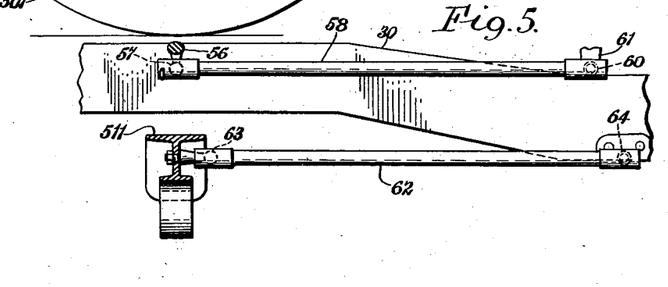
Figure 6:
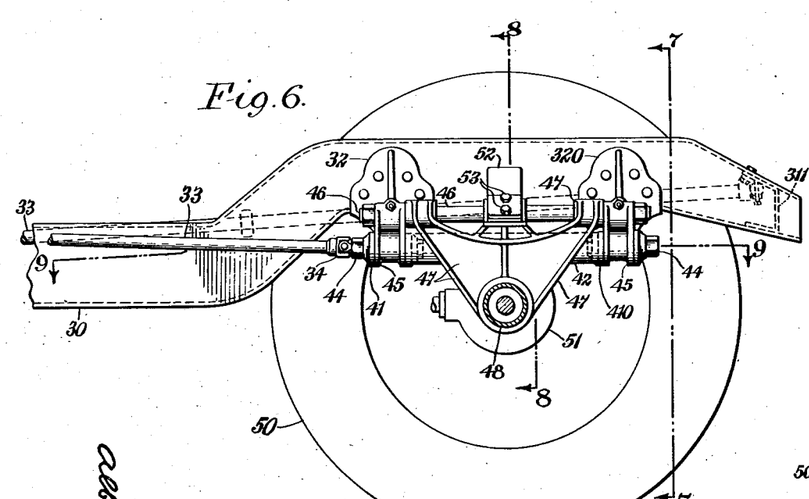
Fig. 6 is a fragmentary, vertical, longitudinal section through the rear end of the vehicle chassis, showing the rear axle and its associated parts.

On this basis, we will now consider the side sway at the front of the vehicle with the spring suspension in normal position as in Fig. 3. If the front center-of-gravity component lies on the line d, there results a zero side sway of the frame relatively to the axle when the vehicle is turned to the right or left as, for instance, when rounding a corner. This is because said line d intersects the axis of the axle pivot 461.

This is believed by the inventor to be a correct statement, but it is admitted that no specific tests have been made to ascertain exactly where the center of gravity must be to obtain zero side sway. However, assuming this relationship, as stated, to be correct, then it follows that if the center-of-gravity component is above the line d the resulting side sway will be positive as in the conventional spring suspension.

If, on the other hand, the center-of-gravity component is situated below the line d, as for instance, on line e, then the side sway is negative. Obviously the amount of such negative side sway is proportional to the distance between the lines d and e. One important feature of negative side sway is that, when rounding a corner, the center of gravity is shifted toward the inside of the curve and hence lessens the possibility of the car turning over. Another distinct advantage of negative side sway is that the tendency of the person or goods in the vehicle to move sidewise under the influence of centrifugal force is lessened. This is because the supporting surface is tilted when the side sway occurs and hence one component of the side sway force is directed perpendicularly downward against said supporting surface. Negative side sway has the further advantage of being much superior as to its psychological reaction on the persons riding in the vehicle as compared with zero or positive side sway, not only because of the decrease in the force tending to move the persons sidewise in their seats, but also because there is a natural tendency for a person to lean inward (or bank) on a curve. This psychological effect is probably chiefly due to the instinctive feeling of greater safety which is obtained when the center of gravity is shifted toward the inside of the curve along which the person is moving.

It is obvious that the amount of side sway varies with the position of the axle pivots relatively to the vehicle frame. When it is desired to keep the maximum possible side sway under any certain definite amount, this may be effected by either positioning the axle pivot high enough above the axle to accomplish this result, or by suitably lowering the center of gravity of the body. It is to be noted in this connection, however, that the factors affecting side sway change very considerably when the frame and axle are approximately in the extreme position of Fig. 8. This is due to the fact that, when the parts are approximately in this position, any outward centrifugal movement of the inner part of the vehicle frame, tends to cause the pivots 43, 44 and 46 to all lie in one straight line, and such a "dead center" tendency is resisted by forces which rapidly approach infinity as said pivots approach a straight line relationship. It should be borne in mind, however, that any such condition as that shown in Fig. 8 would be exceeding rare in actual practice, particularly when the vehicle is equipped with shock absorbers whose chief function is to restrain upward movements of the body relatively to the axle.

It has also been found in the present invention from actual practice and from analysis based on said practice that side sway has been rendered mathematically more negative in amount by reason of the angularity of the links 45 which normally slope down and out from the axle pivots 461. Because of this angularity, when the body shifts laterally in rounding a curve, the outer part of the body is elevated and the inner part allowed to fall, relatively to the axles. Such a tilting is equivalent in its effect to lowering the center of gravity of the body or elevating the axle pivots 461, either of these changes rendering side sway more negative.

From the foregoing it will be seen that the present invention provides a suspension which is particularly applicable to the use of torsion rods as the spring means for supporting the vehicle, although the invention is not limited to the use of such rods. It will further be seen that by providing bearing surfaces for the crank arms and links which are extended lengthwise of the vehicle, these parts in and of themselves resist all brake and driving torque which is imposed upon the vehicle. It will further be seen that by the inclination of the shackles or links inwardly and upwardly from the crank arms to the axle pivot the axles are rendered self-centering and at the same time the axle is capable of being moved sidewise so as to provide lateral cushioning.

I claim as my invention:

1. A vehicle spring suspension for connecting the frame and axle of a vehicle and comprising: a crank arm pivoted longitudinally on said frame; said crank arm having a pivot at its outer part; an axle pivot connected to said axle; means pivoted at its upper end on said axle pivot and at its lower end on said crank arm pivot, said means extending upwardly and inwardly from said crank arm pivot when said crank arm is in a horizontal position; and resilient means to resist rotation of said crank arm.

2. A vehicle spring suspension for connecting the frame and axle of a vehicle and comprising: a crank arm pivoted longitudinally on said frame; said crank arm having a pivot at its outer part; an axle pivot connected to said axle; means pivoted at its upper end on said axle pivot and at its lower end on said crank arm pivot, said means extending upwardly and inwardly from said crank arm pivot when said crank arm is in a horizontal postion; and a torsion rod connected at one end to said frame and extending longitudinally of said frame and connected at its opposite end to said crank arm to resist rotation of said crank arm.

3. A vehicle spring suspension for connecting the frame and axle of a vehicle and comprising: a crank arm pivoted longitudinally on said frame; said crank arm having a pivot at its outer part; an axle pivot connected to said axle; means pivoted at its upper end on said axle pivot and at its lower end on said crank arm pivot, said means extending upwardly and inwardly from said crank arm pivot when said crank arm is in a horizontal position; and the distance between the inner and outer crank arm pivot centers never exceeding two and one-half times the distance between the pivot centers of said axle pivot and said outer crank arm pivot; and resilient means to resist rotation of said crank arm.

4. A vehicle spring suspensin for connecting the frame and axle of a vehicle and comprising: a crank arm pivoted longitudinally on said frame, said crank arm having a pivot at its outer part; an axle pivot connected to said axle; means pivoted at its upper end on said axle pivot and at its lower end on said crank arm pivot, said means extending upwardly and inwardly from said crank arm pivot when said crank arm is in a horizontal position; and resilient means to resist rotation of said crank arm; said elements being so arranged that the line of force derived from said axle and directed against the said pivot at the outer part of said crank arm is able to pass through the axis of said crank arm.

5. A vehicle spring suspension for connecting the frame and axle of a vehicle and comprising: a crank arm pivoted longitudinally on said frame, said crank arm having a pivot at its outer part; an axle pivot connected to said axle; means pivoted at its upper end on said axle pivot and at its lower end on said crank arm pivot, said means extending upwardly and inwardly from said crank arm pivot when said crank arm is in a horizontal position; and a torsion rod normally connected at one end to said frame and extending longitudinally of said frame and connected at its opposite end to resist rotation of said crank arm; said elements being so arranged that the line of force derived from said axle and directed against the said pivot at the outer part of said crank arm is able to pass through the axis of said crank arm.

6. A vehicle spring suspension for connecting the frame and axle of a vehicle and comprising: a crank arm pivoted longitudinally on said frame; a pivot at the outer part of said crank arm; an axle pivot on said axle; means connecting said axle pivot with said crank arm pivot; the pivot mounting for said crank arm and said crank arm pivot and axle pivot each including means maintaining the axes thereof parallel with the axis of said pivot mounting for said crank arm thereby to resist all brake and drive torque reactions in all positions of said axle, crank arm and connecting means; and means resiliently resisting vertical axle movement relative to said frame.

7. A vehicle spring suspension for connecting the frame and axle of a vehicle and comprising: a crank arm pivoted longitudinally on said frame; a pivot at the outer part of said crank arm; an axle pivot on said axle; means connecting said axle pivot with said crank arm pivot; the pivot mounting for said crank arm and said crank arm pivot and axle pivot each including means maintaining the axes thereof parallel with the axis of said pivot mounting for said crank arm thereby to resist all brake and drive torque reactions in all positions of said axle, crank arm and connecting means; and means resiliently resisting vertical axle movement relative to said frame; said elements being so arranged that the line of force derived from said axle and directed against the said pivot at the outer part of said crank arm is able to pass through the axis of said crank arm.

8. A vehicle spring suspension for connecting the frame and axle of a vehicle and comprising: a crank arm pivoted longitudinally on said frame; a pivot at the outer part of said crank arm; an axle pivot on said axle; means connecting said axle pivot with said crank arm pivot; the pivot mounting for said crank arm and said crank arm pivot and axle pivot each including means maintaining the axes thereof parallel with the axis of said pivot mounting for said crank arm thereby to resist all brake and drive torque reactions in all positions of said axle, crank arm and connecting means; and means connected to and resiliently resisting rotation of said crank arm.

9. A vehicle spring suspension for connecting the frame and axle of a vehicle and comprising: a crank arm pivoted longitudinally on said frame; a pivot at the outer part of said crank arm; an axle pivot on said axle; means connecting said axle pivot with said crank arm pivot; the pivot mounting for said crank arm and said crank arm pivot and axle pivot each including means maintaining the axes thereof parallel with the axis of said pivot mounting for said crank arm thereby to resist all brake and drive torque reactions in all positions of said axle, crank arm and connecting means; and a torsion rod connected at one end to said frame and extending longitudinally of said frame and connected at its opposite end to said crank arm to resist rotation of said crank arm.

10. A vehicle spring suspension for connecting the frame and axle of a vehicle and comprising: a crank arm pivoted longitudinally on said frame; a pivot at the outer part of said crank arm; an axle pivot on said axle; means connecting said axle pivot with said crank arm pivot; the pivot mounting for said crank arm and said crank arm pivot and axle pivot each including means maintaining the axes thereof parallel with the axis of said pivot mounting for said crank arm thereby to resist all brake and drive torque reactions in all positions of said axle, crank arm and connecting means; and means resiliently resisting rotation of said crank arm; said elements being so arranged that the line of force between said axle pivot and said crank arm pivot in the normal position of said elements extends upwardly and inwardly from said crank arm pivot through said axle pivot.

11. A vehicle spring suspension for connecting the frame and axle of a vehicle and comprising: a crank arm pivoted longitudinally on said frame; a pivot at the outer part of said crank arm; an axle pivot on said axle; means connecting said axle pivot with said crank arm pivot; the pivot mounting for said crank arm and said crank arm pivot and axle pivot each including means maintaining the axes thereof parallel with the axis of said pivot mounting for said crank arm thereby to resist all brake and drive torque reactions in all positions of said axle, crank arm and connecting means; and means resiliently resisting rotation of said crank arm; said elements being so arranged that the line of force derived from said axle and directed against the said pivot at the outer part of said crank arm is able to pass through the axis of said crank arm.

12. A vehicle spring suspension for connecting the frame and axle of a vehicle and comprising: a crank arm pivoted longitudinally on said frame; a pivot at the outer part of said crank arm; an axle pivot on said axle; means connecting said axle pivot with said crank arm pivot; the pivot mounting for said crank arm and said crank arm pivot and axle pivot each including means maintaining the axes thereof parallel with the axis of said pivot mounting for said crank arm thereby to resist all brake and drive torque reactions in all positions of said axle, crank arm and connecting means; and means resiliently resisting rotation of said crank arm; said elements being so arranged that the line of force derived from said axle and directed against the said pivot at the outer part of said crank arm is able to pass through the axis of said crank arm; and said means connecting said axle pivot with said crank arm pivot extending upwardly and inwardly from said crank arm pivot to said axle pivot in the normal position of said elements.

13. A vehicle spring suspension for connecting the frame and axle of a vehicle and comprising: a crank arm pivoted longitudinally on said frame; a pivot at the outer part of said crank arm; an axle pivot on said axle; means connecting said axle pivot with said crank arm pivot; each of said pivotal connections including bearing means and each of said bearing means being extended longitudinally of said frame to resist substantially all brake and drive torque reactions in all positions of said axle; and means resiliently resisting vertical axle movement relative to said frame.

14. A vehicle spring suspension for connecting the frame and axle of a vehicle and comprising: a crank arm pivoted longitudinally on said frame; a pivot at the outer part of said crank arm; an axle pivot on said axle; means connecting said axle pivot with said crank arm pivot; each of said pivotal connections including bearing means and each of said bearing means being extended longitudinally of said frame to resist substantially all brake and drive torque reactions in all positions of said axle; and means for resiliently restraining rotation of said crank arm; said elements being so arranged that the line of force derived from said axle and directed against the said pivot at the outer part of said crank arm is able to pass through the axis of said crank arm.

15. A vehicle spring suspension for connecting the frame and axle of a vehicle and comprising: a crank arm pivoted longitudinally on said frame; a pivot at the outer part of said crank arm; an axle pivot on said axle; means connecting said axle pivot with said crank arm pivot; each of said pivotal connections including bearing means and each of said bearing means being extended longitudinally of said frame to resist substantially all brake and drive torque reactions in all positions of said axle; and means for resiliently restraining rotation of said crank arm; said elements being so arranged that the line of force between said axle pivot and said crank arm pivot in the normal position of said elements extends upwardly and inwardly from said crank arm pivot through said axle pivot.

16. A vehicle spring suspension for connecting the frame and axle of a vehicle and comprising: a crank arm pivoted longitudinally on said frame; a pivot at the outer part of said crank arm; an axle pivot on said axle; means connecting said axle pivot with said crank arm pivot; each of said pivotal connection including bearing means and each of said bearing means being extended longitudinally of said frame to resist substantially all brake and drive torque reactions in all positions of said axle; and a torsion rod connected at one end to said frame and extending longitudinally of said frame and connected at its opposite end to said crank arm to resist rotation of said crank arm.

17. A vehicle spring suspension for connecting the frame and axle of a vehicle and comprising: a crank arm pivoted longitudinally on said frame; a plurality of crank arm pivots at the outer part and at opposite sides of said crank arm; an axle pivot having a plurality of bearing surfaces spaced longitudinally of said frame; a plurality of links each connecting one of said bearing surfaces with the corresponding pivot at the outer end of said crank arm and said links and the pivotal connections thereof with said pivots being spaced longitudinally of said frame to resist substantially all brake and drive torque reactions; and resilient means to resist vertical movement of said axle relative to said frame.

18. A vehicle spring suspension for connecting the frame and axle of a vehicle and comprising: a crank arm pivoted longitudinally on said frame; a plurality of crank arm pivots at the outer part and at opposite sides of said crank arm; an axle pivot having a plurality of bearing surfaces spaced longitudinally of said frame; a plurality of links each connecting one of said bearing surfaces with the corresponding pivot at the outer end of said crank arm and said links and the pivotal connections thereof with said pivots being spaced longitudinally of said frame to resist substantially all brake and drive torque reactions; and resilient means resisting rotation of said crank arm; said elements being so arranged that the line of force derived from said axle and directed against the said pivots at the outer part of said crank arm is able to pass through the axis of said crank arm.

19. A vehicle spring suspension for connecting the frame and axle of a vehicle and comprising: a crank arm pivoted longitudinally on said frame; a plurality of crank arm pivots at the outer part and at opposite sides of said crank arm; an axle pivot having a plurality of bearing surfaces spaced longitudinally of said frame; a plurality of links each connecting one of said bearing surfaces with the corresponding pivot at the outer end of said crank arm and said links and the pivotal connections thereof with said pivots being spaced longitudinally of said frame to resist substantially all brake and drive torque reactions; and resilient means for resisting rotation of said crank arms; said links connecting said axle pivot and the pivots at the outer part of said crank arm extending upwardly and inwardly from said pivots at the outer part of said crank arm to said axle pivot in the horizontal position of said crank arm.

20. A vehicle spring suspension for connecting the frame and axle of a vehicle and comprising: a crank arm pivoted longitudinally on said frame; a plurality of crank arm pivots at the outer part and at opposite sides of said crank arm; an axle pivot having a plurality of bearing surfaces spaced longitudinally of said frame; a plurality of links each connecting one of said bearing surfaces with the corresponding pivot at the outer end of said crank arm and said links and the pivotal connections thereof with said pivots being spaced longitudinally of said frame to resist substantially all brake and drive torque reactions; and a torsion rod connected at one end to said frame and extending longitudinally of said frame and connected at its opposite end to resist rotation of said crank arm.

21. A vehicle spring suspension for connecting the frame and axle of a vehicle and comprising: a crank arm pivoted longitudinally of the frame; means connecting said axle and crank arm and including a pivot at the outer part of said crank arm; an axle pivot on said axle; and a shackle connecting said axle pivot with said crank arm pivot, each of said pivotal connections including bearing means and each of said bearing means being extended longitudinally of said frame to resist substantially all brake and drive torque reactions; means included in said connecting means and permitting substantial movement of said axle longitudinally of said frame without causing said axle to rotate relative to said frame; and resilient means to resist vertical movement of said axle relative to said frame.

22. A vehicle spring suspension for connecting the frame and axle of a vehicle and comprising: a crank arm pivoted longitudinally of the frame; means connecting said axle and crank arm and including a pivot at the outer part of said crank arm; an axle pivot on said axle, and a shackle connecting said axle pivot with said crank arm pivot, each of said pivotal connections including bearing means and each of said bearing means being extended longitudinally of said frame to resist substantially all brake and drive torque reactions; means included in said connecting means and permitting at least one-fourth inch of movement of said axle longitudinally of said frame without causing said axle to rotate relative to said frame; and resilient means to resist vertical movement of said axle relative to said frame.

23. A vehicle spring suspension for connecting the frame and axle of a vehicle and comprising: a crank arm pivoted longitudinally of the frame; means connecting said axle and crank arm and including a pivot at the outer part of said crank arm; an axle pivot on said axle, and a shackle connecting said axle pivot with said crank arm pivot, each of said pivotal connections including bearing means and each of said bearing means being extended longitudinally of said frame to resist substantially all brake and drive torque reactions; means included in said connecting means and permitting at least one-fourth inch of movement of said axle longitudinally of said frame without causing said axle to rotate relative to said frame; and resilient means resisting rotation of said crank arm; said elements being so arranged that the line of force derived from said axle and directed against the said pivot at the outer part of said crank arm is able to pass through the axis of said crank arm.

24. A vehicle spring suspension for connecting the frame and axle of a vehicle and comprising: a pair of crank arms secured together and pivoted longitudinally on said frame; pivot means at the outer part of said crank arm; a pivot pin on said axle; a pair of shackles secured together and connecting the pivot means of said crank arm with said pivot pin; said pair of crank arms and pair of shackles being arranged in planes extending longitudinally of said frame to resist substantially all brake and drive torque reactions and longitudinal thrust from said axle to said frame; and resilient means to resist vertical movement of said axle relative to said frame.

ALBERT F. HICKMAN.